United States Patent [19]
Villareal-Paredes

[11] 3,817,275
[45] June 18, 1974

[54] VALVE FOR TANKS OF SANITARY APPARATUS

[76] Inventor: Alfonso Villareal-Paredes, Nuevo Leon, Monterrey, Mexico

[22] Filed: Sept. 1, 1971

[21] Appl. No.: 177,008

[52] U.S. Cl. ............................................. 137/436
[51] Int. Cl. .......................................... F16k 31/14
[58] Field of Search .......... 137/429, 430, 432, 444, 137/436

[56] References Cited
UNITED STATES PATENTS

| | | | |
|---|---|---|---|
| 1,270,901 | 7/1918 | Watrous | 137/432 |
| 2,477,224 | 7/1949 | Wright | 137/430 X |
| 2,809,656 | 10/1957 | Goldtrap | 137/430 |
| 3,115,153 | 12/1963 | Delamater | 137/432 X |
| 3,428,966 | 2/1969 | Schoepe et al. | 137/432 X |

FOREIGN PATENTS OR APPLICATIONS

| | | | |
|---|---|---|---|
| 1,415,806 | 9/1965 | France | 137/432 |

Primary Examiner—Henry T. Klinksiek
Assistant Examiner—David R. Matthews
Attorney, Agent, or Firm—Laurence R. Brown

[57] ABSTRACT

A water closet has as a float a partially water filled plastic bottle held in a guiding pipe for free vertical movement. A glass marble is used as a ball valve to admit water. The water level is controlled by the amount of water in the bottle which is a weight resting on a lever arrangement passing water into the closet until it is floated by the appropriate water level in the closet.

3 Claims, 4 Drawing Figures

VALVE FOR TANKS OF SANITARY APPARATUS

This invention relates to control valves for regulating the water level in water closets or tanks.

Apparatus now in use have levers such as long rods, with screws at the ends, which rods may be flexed or rotated as the water level changes. In this invention two short levers with better strength are used to eliminate rotation.

Conventionally a hollow ball is used as a float requiring a large tank. In this invention the float is a bottle half full of water acting directly on one of the levers, to considerably reduce the space inside the tanks required by conventional apparatus.

In conventional tanks the power produced by floating hollow ball is used to stop the flow of water. In this invention the pressure of the water and one spring are used to stop the flow of water.

Thus, the higher the pressure of water supplied to the tank the greater the closing power for stopping its flow. This is advantageous, since a constant level may be maintained when the water pressure varies, whereas with conventional valves, increases in water pressure may cause more water to flow into the tank before the valves close.

Also, this invention has the advantage of economy in maintenance and parts. For example, the float that controls the flow of water may be made of empty plastic bottles in which a product was bottled. Thus, such bottles can be reused to replace the float as it deteriorates by the action of time and water.

In case of the valve stopping the flow of water, glass marbles are used, such as those used by children in play. This eliminates the problem of getting special spares at only specialty stores and provides the advantage of simple replacement with parts readily found in any place.

The main objective of this invention is to employ the above mentioned advantages to produce a valve of longer life and safer operation.

Other objects and important features of the invention will be apparent from a study of the following specification considered with the drawing. Together they describe and illustrate a preferred embodiment of the invention considered now to be the best mode of practising the principles thereof. However, other embodiments of the invention may be suggested to those having the benefit of the teachings herein, and such other embodiments are intended to be covered by the scope and spirit of the subjoined claims.

Figure 1:
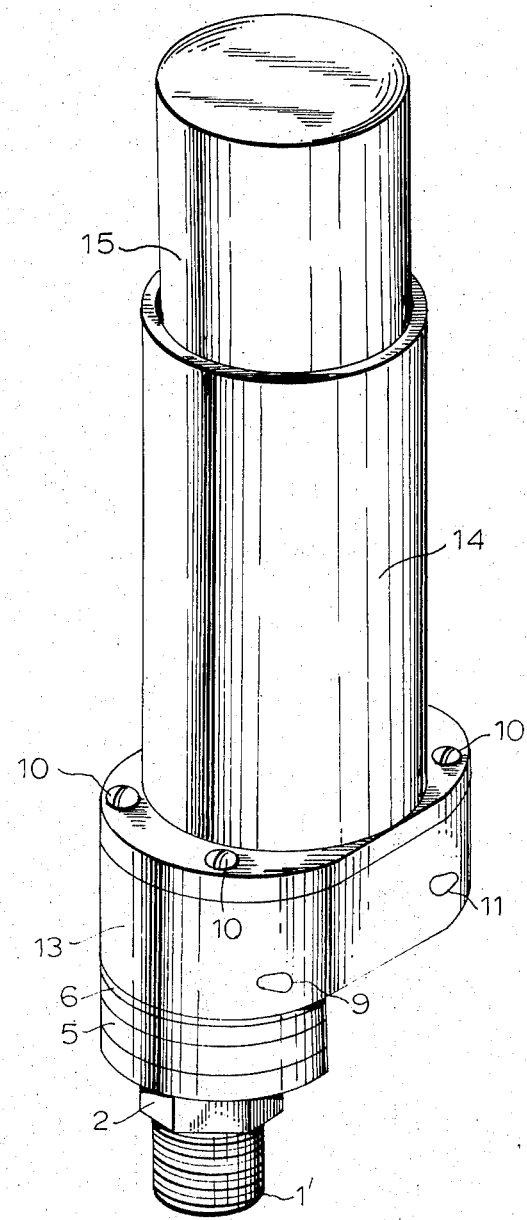
FIG. 1 is a perspective view of the valve.
Figure 2:
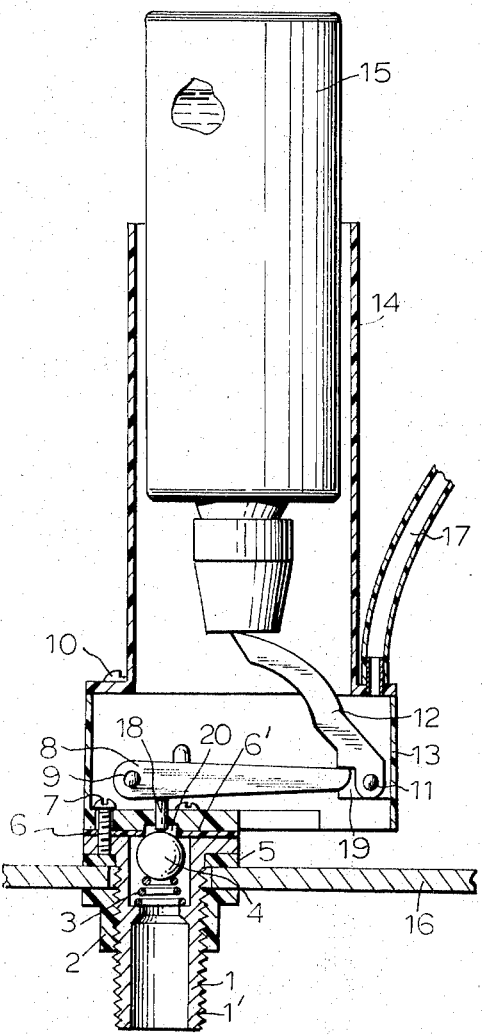
FIG. 2 is an elevation view, partly in section to show the internal mechanism and water flow inside the valve.
Figure 3:
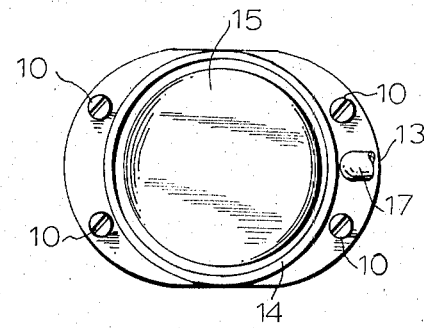
FIG. 3 is a plan view of the valve.
Figure 4:
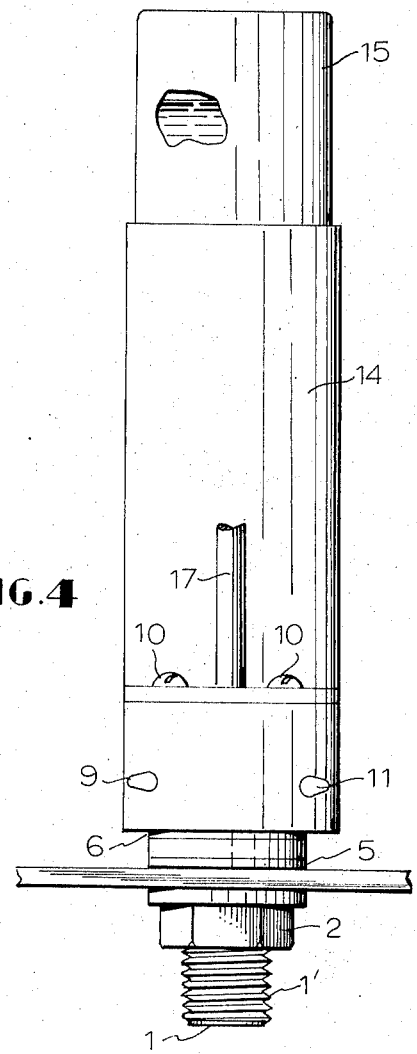
FIG. 4 is a right side elevation view as seen from FIG. 2.

Referring now to the drawings, this valve is mounted on the bottom of the tank 16 by a joining piece 1 of plastic or metal having screw threads 1 bis on the lower end. A nut 2 presses the gasket 5 between the joining piece 1 and the bottom of the tank 16. Also the joining piece 1 is a pipe that provides for flow of water to the tank 16 and the valve.

On the upper surface of the joining piece 1 is gasket 6 made of rubber or another suitable material. The gasket is held between body 13 and the joining piece 1 by screws 7 or other fastening means.

Held inside the joining piece 1 is a glass ball 4 similar to a marble to contact gasket 6 and stop the flow of water. Thus, the spring 3 pushes the ball 4 into gasket 6, helped by the pressure of water in the pipe. When the water pressure is more than 0.8 pounds per square inch, the spring 3 need not be used, the pressure of the water itself serving to close the flow of water by urging ball 4 into gasket 6.

Inside the body 13, there are two levers 8, 12 of plastic or metal, which pivot on respective axes 9 and 11. Guide pipe 14 is fastened on body 13 by means of screw 10 or other fastening means. Inside the guide pipe 14 is a bottle 15 which can freely slide up and down. This bottle 15 has been filled previously with water up to a predetermined level that is less than 100 percent. The water level in the bottle 15 determines the water level inside tank 16, so that the sanitary apparatus or water closet will properly function. The partially filled bottle 15 has buoyancy in water but by action of gravity has enough weight to power opening of the valve as the water level inside the tank 16 descends.

Based on the foregoing description, the valve operates as follows: Once the valve is installed inside tank 16, as water flows through the water pipe connected to joining piece 1 the ball 4 is held in contact with the seat 6 bis from the pressure of spring 3 and the water inside the pipe. This closes the passageway for water into tank 16, so that the tank will be empty.

The bottle 15 acts as a float and a counterweight proportioned to the water it contains. The water level inside the bottle 15 is calculated to permit levers 8, 12 through pusher 18 to push the ball 4 downward from the weight of the bottle 15 and water inside it. Thus the weight on curved lever 12 will push the link 19 with straight lever 8 to move pusher 18 opening entrance 20 so that water will pass inside tank 16 through filler 17. As the water level rises inside tank 16, the bottle 15 will float and the ball 4 will move into seat 6 bis and stop the flow of water into the tank. This operation may be repeated whenever necessary.

Having thus described the invention and its advantages, those features of the invention which are claimed follow:

1. A valve assembly for variably controlling the level of liquid in a tank such as a water closet to be filled from a source of liquid under pressure, comprising in combination, a substantially cylindrical self contained housing assembly with pipe means extending therefrom for affixing the housing to the bottom of said tank and passing said liquid into said tank therethrough, a ball valve located inside said pipe means at the bottom of said tank having the ball arranged to close the valve by urging the ball upwardly to stop the flow of liquid into said tank at least in part by pressure of the liquid from said source in said pipe means, a short transverse first lever member pivoted within said housing with a vertically movable pusher member bearing on said ball to urge it downwardly to open the valve and permit the flow of liquid into said housing through said pipe means, a second short transverse lever member pivoted in said housing to bear upon the first lever member and move the pusher member thereby, a float comprising a cylindrical closed container substantially of the same diameter as said housing partially filled with liquid and guided within said housing for vertical movement with its weight resting upon said second lever member to thereby urge said ball downwardly to open said valve and having a buoyancy determined by the liquid therein which will permit floating as the water level within said housing and said tank reaches a predetermined level, whereby the weight of the container actuating said two lever members is decreased to close said valve and prevent further flow of liquid from said source into said tank.

2. A valve assembly as defined in claim 1 wherein said closed container is a plastic bottle having a cap contacting said second lever.

3. A valve assembly as defined in claim 1 wherein said ball is a marble.

* * * * *